(12) United States Patent
Singh

(10) Patent No.: US 12,423,399 B1
(45) Date of Patent: Sep. 23, 2025

(54) LEVERAGING SPATIAL COMPUTING TO MODIFY SMART CARD PROPERTIES

(71) Applicant: Bank of America Corporation, Charlotte, NC (US)

(72) Inventor: Shailendra Singh, Maharashta (IN)

(73) Assignee: Bank of America Corporation, Charlotte, NC (US)

( * ) Notice: Subject to any disclaimer, the term of this patent is extended or adjusted under 35 U.S.C. 154(b) by 61 days.

(21) Appl. No.: 18/611,926

(22) Filed: Mar. 21, 2024

(51) Int. Cl.
| | | |
|---|---|---|
| G06F 21/00 | (2013.01) | |
| G06F 21/32 | (2013.01) | |
| G06K 7/10 | (2006.01) | |

(52) U.S. Cl.
CPC ......... *G06F 21/32* (2013.01); *G06K 7/10366* (2013.01)

(58) Field of Classification Search
CPC .............................. G06F 21/32; G06K 7/10366
See application file for complete search history.

(56) References Cited

U.S. PATENT DOCUMENTS

| | | | |
|---|---|---|---|
| 11,790,345 B2 | 10/2023 | Singh | |
| 2018/0150831 A1* | 5/2018 | Dolan | G06Q 20/321 |
| 2018/0150844 A1* | 5/2018 | Dolan | G06V 40/70 |
| 2018/0204196 A1* | 7/2018 | Licht | G06Q 20/12 |
| 2022/0051248 A1* | 2/2022 | Gandhi | G06Q 20/3229 |
| 2022/0237584 A1* | 7/2022 | Gupta | G06Q 20/388 |
| 2023/0245098 A1* | 8/2023 | Singh | G06F 3/0482 |
| | | | 705/41 |

* cited by examiner

*Primary Examiner* — William A Corum, Jr.
(74) *Attorney, Agent, or Firm* — Weiss & Arons LLP (57) ABSTRACT

A method for modifying smart card properties of a smart card leveraging a spatial computing device is provided. The spatial computing device may be in electronic communication with an entity server. The method may include identifying the smart card within a field of view of the spatial computing device. The method may include establishing a wireless communication between the smart card and the spatial computing device. The method may further include generating a digital copy of the smart card and displaying the digital copy of the smart card on a display of the spatial computing device. The method may further include displaying a plurality of selectable options for modifying card properties of the smart card and in response to a detection of a selection of one of the selectable options, transmitting a request to the entity server to modify a property of the smart card based on the selected option.

20 Claims, 7 Drawing Sheets

LEVERAGING SPATIAL COMPUTING TO MODIFY SMART CARD PROPERTIES

FIELD OF TECHNOLOGY

Aspects of the disclosure relate to providing apparatus and methods for use with spatial computing devices. In particular, the disclosure relates to apparatus and methods for modifying card properties via the spatial computing device.

BACKGROUND OF THE DISCLOSURE

Credit cards have default properties and settings. These properties and settings may be stored at an entity server and later identified upon connecting with a point of sale device. Typically, the properties and settings may be altered on an entity website associated with the credit card or by calling a customer service representative of the entity.

Today, extended reality is being used for an increasing number of applications. Such extended reality devices may leverage extended reality, virtual reality, augmented reality and any other suitable technology. Extended reality is well known for its exciting user interfaces, enhanced abilities for providing interactive experiences and increased customer satisfaction.

It would be desirable, therefore, to enable a user of a credit card to change one or more properties on the smart card leveraging the spatial computing device.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

A method for modifying smart card properties of a smart card in real-time is provided. The method may leverage a spatial computing device. The spatial computing device may be in electronic communication with an entity server.

A spatial computing device, in accordance with principles of the disclosure, may be a wearable device including extended reality ("XR") technology, i.e.—augmented reality and/or virtual reality.

The smart card may be a credit card. The smart card may include a microprocessor and/or memory chip embedded in it that, when coupled with a smart card reader, has the processing power to execute applications.

A smart card may be a physical card that has an embedded integrated chip that may perform as a security token. Smart cards are typically the same size as a driver's license or credit card. The smart card may be made out of metal or plastic. Smart cards may be enabled to connect to a reader. The connection may be direct physical contact, or through a short-range wireless connectivity standard such as radio-frequency identification (RFID) or near-field communication.

The chip on a smart card can be either a microcontroller or an embedded memory chip. Smart cards may be designed to be tamper-resistant and use encryption to provide protection for in-memory information. Cards with microcontroller chips may perform processing functions on the card and manipulate information in the chip's memory.

The spatial computing device may be in the ownership of a user of an entity. The spatial computing device may be registered with the entity. The spatial computing device may communicate with the entity server for authenticating the user. The spatial computing device may be registered under a user profile of the user within the entity.

The method may include authenticating a user of the spatial computing device when the spatial computing device is determined to be positioned on a user. When the spatial computing device comes in contact with the eyes of the user, the user may automatically be authenticated. The spatial computing device may leverage iris recognition to authenticate the retina of the eye of the user. An image of the retina may be stored within the user's profile at the entity server and may be compared to the iris of the user for authenticating.

When the spatial computing device comes in contact with an individual that is not the registered user of the device, the user may not be authenticated. An electronic communication with the entity server may automatically be disconnected when the user is not authenticated.

Following authentication, the method may include identifying the smart card using a camera embedded in the spatial computing device. The smart card may be identified when the smart card is within a field of view of the spatial computing device. The smart card may be held by the user within the field of view of the spatial computing device. The smart card may be positioned in front of the special computing device.

The method may include capturing a motion on the smart card. The motion may be associated with a first gesture on the smart card. The first gesture may be a tap on the smart card. The first gesture may include waving the smart card, a swiping gesture or any other suitable motion.

The method may include, in response to the capturing of the motion, establishing a wireless communication between the smart card and the spatial computing device. The wireless communication may be a near-field communication ("NFC"). NFC capabilities may be embedded in the spatial computing device. NFC capabilities may also be embedded at the smart card in order to enable a wireless communication.

The method may include pairing the spatial computing device to the smart card when the spatial computing device is within a pre-determined proximity of the smart card. The pre-determined proximity of the smart card may be a proximity that enables the NFC communication. Exemplary NFC communication ranges may be 0-1 inches, 0-1.5 inches, 0-2 inches, 0-2.5 inches, 0-3 inches, 0-3.5 inches, 0-4 inches, 0-4.5 inches, 0-5 inches, or any other suitable range supported by NFC apparatus.

The method may further include generating a digital copy of the smart card. The generating of the digital copy of the smart card may be a digital twin of the smart card. The digital twin of the smart card may include smart card properties retrieved from the entity server.

Additionally, the spatial computing device may leverage machine learning, image recognition and deep learning to identify and extract data to the digital twin.

In some embodiments, the digital copy of the smart card may be an image of the smart card.

The method may include displaying the digital copy of the smart card on a display of the spatial computing device. In some embodiments the digital copy displayed may be displayed as an exact copy, i.e.—an image of the smart card.

In parallel to the displaying of the digital copy, the method may include displaying a plurality of selectable options for modifying card properties of the smart card.

One of the selectable options may include a geofencing selectable option for geofencing a location for use by the smart card. When the second gesture selects the geofencing selectable option, the method may include displaying, in the display, a virtual map of a geographic location. The geographic location displayed may be a location based on the location where the user is situated. The geographic location displayed may be a location based on the address of residency of the user or any other suitable location.

The method may further include capturing a motion of a selection of a geographic boundary from within the display. The method may further include, following the capturing of the motion of the selection, extracting a plurality of coordinates of the selected geographic boundary.

The method may include transmitting the instruction to the entity server including a request to modify the boundaries of use for the smart card. The request may also include the boundaries of use defined by the plurality of coordinates.

Another one of the selectable options may include a card lock selectable option. The card lock selectable option may enable the user to opt-in to lock the card for use for a duration of time.

When the second gesture selects the card lock selectable option, the method may include identifying a request to lock the smart card via capturing a cross gesture motion. The cross gesture motion may be performed by a hand of the user swiped in front of the digital copy of the smart card.

The method may also include receiving input of a time period for a length of time for locking the smart card. The time period may be inputted via finger motions of the user in the display. The finger motions may be captured by the spatial computing device and the numbers inputted may be identified.

The method may include transmitting the instruction to the entity server including a request to lock the smart card. The request may also include the time period inputted.

One of the selectable options may include a transfer of funds selectable option. The transfer of funds selectable option may enable the user to transfer funds from the smart card to an additional one or more cards. Each card that is a recipient of the transfer may be displayed as a digital copy in the display. The user may bring the additional smart cards to within the field of view of the spatial computing device, and upon capturing a gesture for initiating the digital copy, the spatial computing device may generate the digital copy of the additional one or more smart cards.

When the second gesture selects the transfer of funds selectable option, the method may include identifying the additional smart card within the field of view of the spatial computing device. Following the identifying, the method may include capturing a motion associated with the first gesture on the additional smart card.

In response to the capturing of the motion, the method may include establishing the electronic communication with the additional smart card. The method may further include generating a digital copy of the additional smart card. The method may further include authenticating the additional smart card via the entity server.

When the motion is identified comprising a swipe gesture, the method may include identifying the request to execute the transfer of funds from the smart card to the additional smart card. In response to the swipe gesture, the method may include displaying to the user an input field for receipt of a value of funds for being transferred. The method may include, in response to the displaying, receiving input of the value of funds.

The method may include transmitting the first instruction to the entity server. The first instruction may include a request to execute the transfer of funds to the additional smart card. The request may also include the value of funds to be transferred.

One of the selectable options may include a customization of the smart card selectable option. The customization of the smart card may include selecting changes to the actual physical look of the smart card. This may include changing a background color and/or design on the smart card. The customization may include changing a layout of the display on the smart card. Each of these changes, upon selection, may be transmitted to the entity server for authentication.

In some embodiments customization changes may entail generating a new physical card for the user and actually mailing the new physical card to the user to replace the original card.

In some embodiments, customization changes may automatically be performed at the smart card when the smart card includes a touch screen. The touch screen may include organic light emitting diode ("OLED") technology. A touch screen constructed using OLED technology may have a thickness that is not greater than 0.25 mm. OLEDs may be flexible. The microprocessor may configure a touch screen constructed using OLEDs to display information including color, designs, and any other suitable customized data. OLEDs are typically solid-state semiconductors constructed from a thin film of organic material. OLEDs emit light when electricity is applied across the thin film of organic material.

When the second gesture selects the customization of the smart card selectable option, the method may include displaying a plurality of customization options in the display. The method may further include receiving a selection of one or more selections from the plurality of customization options via the gesture.

The method may further include transmitting the first instruction to the entity server including a request to customize the smart card and the selected one or more selections.

The selectable options may further include any other suitable modifications to the smart card.

Following the transmitting of the instruction to the entity server, the entity server may determine, based on the user's credentials and a user profile associated with the user, whether to authenticate the request.

In response to receiving an approval of the request by the entity server, the method may include updating a user account associated with the smart card based on the selected option. The updating may include updating the user account stored on the entity server. When the smart card initiates a transaction at a point-of-sale ("POS") device the POS device may receive the updated properties of the smart card.

In some embodiments, the smart card may include capabilities for storing card property data at the smart card. The storing may be enabled via an E-SIM embedded in the smart card. When the smart card includes the E-SIM, the spatial computing device may be configured to transmit a second instruction to the smart card. The second instruction may include automatically synchronizing the selected modifications to the smart card properties stored on the smart card. The changes to the smart card properties may be based, at least in part, on the selected option.

A spatial computing device for modifying smart card properties of a smart card in real-time is provided. The spatial computing device may be in electronic communication with an entity server.

The spatial computing device may include a microprocessor. Other components of the spatial computing device may include one or more displays, one or more cameras for capturing photographs and/or videos, one or more audio input devices, one or more audio output devices and/or one or more wired and/or wireless communication modules (e.g., Bluetooth®, Beacon®).

One or more software modules may execute on the processors. The one or more software modules may be stored in a memory located within the spatial computing device. The one or more software modules may, in the alternative, be referred to as applications. The applications may enable the spatial computing device to execute various tasks.

In addition to software modules, the spatial computing device may also include a display. In one embodiment, the spatial computing device display may be physically configured to add data alongside what the wearer sees through the device. In some embodiments, the spatial computing device display may display data as an at least partially transparent overlay on top the lenses. As such, the user may view, through the overlay, the physical objects that are normally seen through lenses. Such a spatial computing device display may be known as an augmented reality spatial computing devices display.

The spatial computing device may also include one or more communication transceivers. The communication transceivers may be operable to communicate with external processors. The external processors may be included in the smart card, a mobile device or any other suitable computing device.

The spatial computing device may include a contactless communication module. The contactless communication module may operate on the spatial computing device processor. The contactless communication module may initiate communication with another spatial computing device.

In some embodiments, the contactless communication module may be an active NFC reader. As such, the contactless communication module may communicate with another spatial computing device using NFC technology. The spatial computing device may be an NFC powered device.

The distance that may enable a communication between the spatial computing device and additional devices may be within the NFC enabled communication ranges.

The plurality of software components may also include an NFC controller module. The NFC controller module may operate as the software for the active NFC reader. As such, the NFC controller module may activate NFC communication via the NFC reader.

The NFC controller module may also send and/or receive user data, modification card data, payment data and/or authentication data. As such, the NFC controller module may receive the captured data from the information controller module. The captured data may include the transaction amount and/or the PIN. The NFC controller module may transmit the captured data to a wireless controller module.

In some embodiments, the contactless communication module may be via light fidelity ("Lifi") technology. Lifi is a two-way network protocol for high speed connectivity using light technology. LiFi is a light-based communication system capable of transmitting data wirelessly at high speed using light emitting diodes (LEDs).

Identification data may be extracted from the smart card and displayed on the digital copy of the smart card. Identification data may include information that may be visual to a user's eye. This information may include a name of the cardholder of the smart card, a card account number, security code, expiration date and a bank routing number. The data may be cognitively extracted from the smart card.

Spatial computing device may be operable to receive commands from a user. The commands may be received in different ways. For example, the commands may be received from the user via touch gestures to one or more dynamic or static buttons on a viewable and actionable display associated with the spatial computing device. The commands may also be received from the user via touch gestures to one or more portions of the frames of the spatial computing device. Touch gestures may include swiping, pressing, tapping and squeezing. Touch gestures may also include a pattern of any of the abovementioned gestures.

The commands may also be received from air-based hand and/or body gestures. Air-based hand and/or body gestures may be performed by the user's hand or body without specifically touching the spatial computing device. Various sensors, such as an accelerometer, gyroscope and touch pad may sense the hand and/or air gestures. Upon sensing the hand and/or air gestures, the sensor(s) and/or associated processors may translate the hand and/or air gestures into commands. The commands may be based on a command structure received from an external processor. The command structure may be a payment structure.

The hardware components may also include a microprocessor. The microprocessor may be operable to initiate a transaction.

The hardware components may also include a display. The display may display software displays. The microprocessor may instruct the display regarding the software displays.

The hardware components may also include a battery. The battery may power the display and/or the microprocessor.

The hardware components may also include a nano wireless network interface card ("NIC"). The nano wireless NIC may establish communication with a wireless network.

The hardware components may also include an active NFC reader. The active NFC reader may detect one or more other spatial computing devices and/or smart cards within a predetermined proximity to the spatial computing device. The active NFC reader may establish communication with the one or more other spatial computing devices.

The spatial computing device may also include a plurality of software components.

The plurality of software components may include a digital number pad. The digital number pad may display numerical digital software selections to the user. The digital number pad may also receive numerical input from the user.

The plurality of software components may also include an information controller module. The information controller module may capture data via the digital number pad. The captured data may include a transaction amount and/or a PIN. As such, the received numerical input may correspond to the transaction amount and/or the PIN.

The microprocessor may be operable to authenticate a user of the spatial computing device when the spatial computing device is positioned on a user. The spatial computing device may be configured to authenticate the user via authentication of a biometric of the user. When the biometric of the user is not authenticated, the spatial computing device may be automatically deactivated.

In some embodiments, when the biometric of the user is not authenticated, the entity server may not enable wirelessly communicating with the spatial computing device for the user.

The spatial computing device may include one or more sensors and a camera. The one or more sensors and/or the camera may be operable to identify the smart card when the smart card is within a predetermined proximity to the spatial computing device.

When the smart card is within the predetermined proximity to the spatial computing device, the spatial computing device may be configured to establish a wireless communication with the smart card. The wireless communication may be enabled via NFC.

The spatial computing device may include an NFC tag, an NFC reader and an antennae for communicating with the smart card. The smart card may include NFC capabilities including an NFC tag to enable the wireless communication.

The spatial computing device may pair with the smart card.

The camera may be configured to capture a motion. The motion may be associated with a first gesture on the smart card.

In some embodiments, following the capture of the motion, the camera may capture an image of the smart card. In some embodiments, following the capture of the motion, the microprocessor may be configured to generate a digital copy of the smart card. The microprocessor may leverage deep learning algorithms for generating the digital copy of the smart card.

The spatial computing device may include a wireless communication module. The wireless communication module may be operable to, in response to the motion identified, pair the spatial computing device to the smart card.

The spatial computing device may be configured to retrieve card properties stored at the smart card via the wireless communication module.

The spatial computing device may include a display. The display may be operable to display an AR display. The AR display may display the digital copy of the smart card. The AR display may display a plurality of selectable options for modifying card properties of the smart card.

The camera may be further operable to identify a selection, in response to a detection of a second gesture. The second gesture may be a selection of one of the plurality of selectable options.

The microprocessor may be further operable to, based on the selection of one of the plurality of selectable options, transmit a first instruction to the entity server. The first instruction may include a request to modify a property of the smart card based on the selected option.

In response to a receipt of an approval of the request from the entity server, the microprocessor may further be configured to transmit an instruction to the smart card. The instruction may instruct the smart card to automatically synchronize the selected modifications to the card properties stored on the smart card. The changes to the smart card may be based, at least in part, on the selected option.

The spatial computing device may include a battery. The battery may be operable to power the camera, the microprocessor and the display.

Illustrative embodiments of apparatus and methods in accordance with the principles of the invention will now be described with reference to the accompanying drawings, which form a part hereof. It is to be understood that other embodiments may be utilized, and structural, functional and procedural modifications may be made without departing from the scope and spirit of the present invention.

The drawings show illustrative features of apparatus and methods in accordance with the principles of the invention. The features are illustrated in the context of selected embodiments. It will be understood that features shown in connection with one of the embodiments may be practiced in accordance with the principles of the invention along with features shown in connection with another of the embodiments.

Apparatus and methods described herein are illustrative. Apparatus and methods of the invention may involve some or all of the features of the illustrative apparatus and/or some or all of the steps of the illustrative methods. The steps of the methods may be performed in an order other than the order shown or described herein. Some embodiments may omit steps shown or described in connection with the illustrative methods. Some embodiments may include steps that are not shown or described in connection with the illustrative methods, but rather shown or described in a different portion of the specification.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Figure 1:
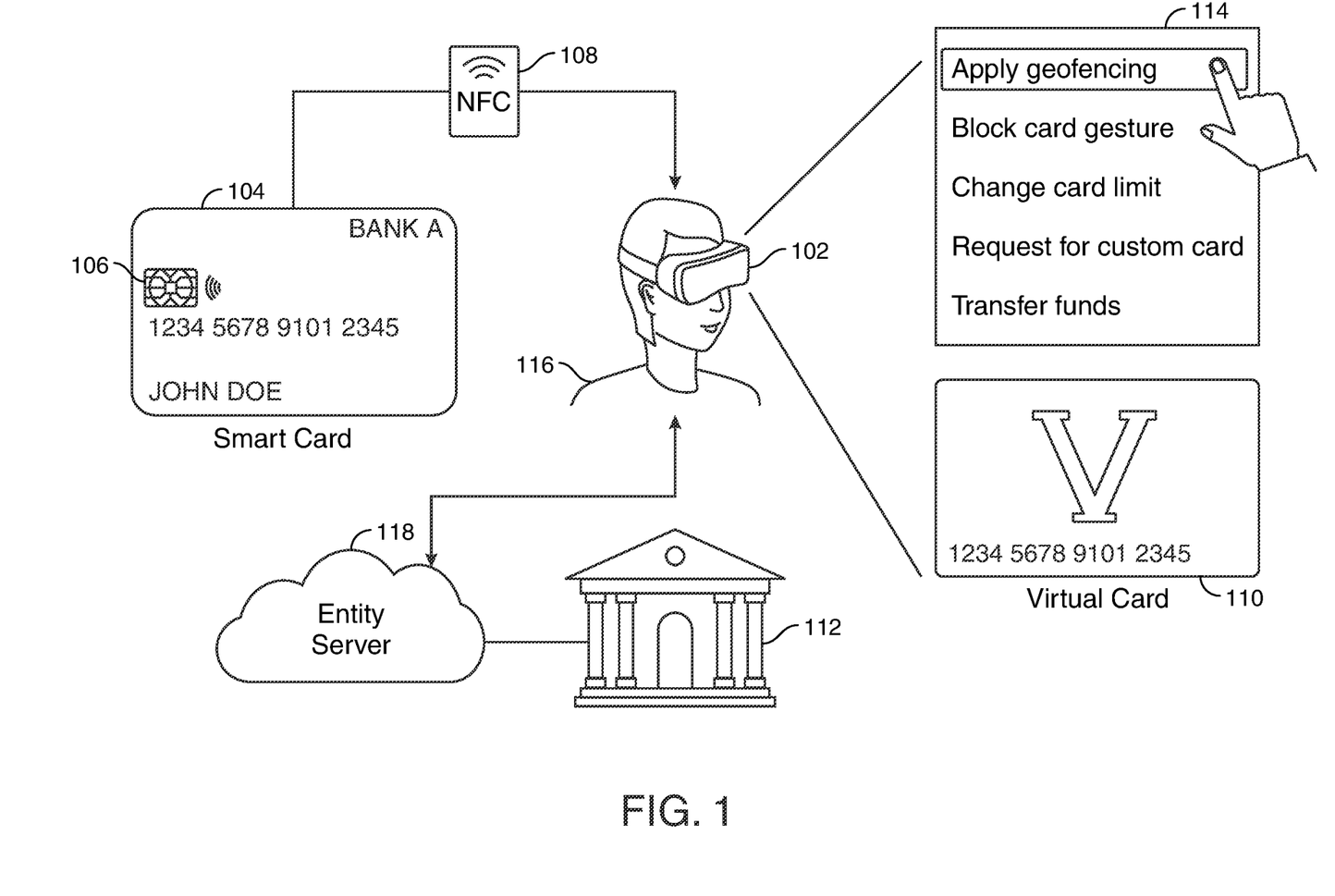
FIG. 1 shows an illustrative system architecture in accordance with principles of the disclosure.

FIG. 1 shows an illustrative system architecture in accordance with principles of this disclosure.

User 116 may be wearing spatial computing device 102. Spatial computing device 102 may be in electronic communication with a financial entity 122 via an entity server 118. Spatial computing device 102 may host a card modification application at the device. The card modification application may be an application executed by entity server 118 following a detection of a smart card within the field of view of the spatial computing device.

User 116 may retrieve smart card 104. Smart card 104 may be a physical credit card residing in the wallet of user 116. Smart card 104 may be a digital credit card viewed on a user interface of a smartphone of user 116.

User 116 may retrieve smart card 104 and position the smart card within a field of view of spatial computing device 102. Upon a tap on smart card 104, via user 116, spatial computing device 102 may be triggered to generate a digital copy of smart card 104.

The digital copy of the smart card may be displayed within a virtual display, as shown at 110.

A display of selectable options 114 may also be displayed within the virtual display. Selectable options 114 may include a plurality of options for modifying card properties on the smart card. The selectable options may include an option to apply geofencing, an option to block the card use, an option to transfer funds and an option to customize the smart card. An option to change the limit of spending on the card may also be a selectable option (not illustrated).

Figure 2:
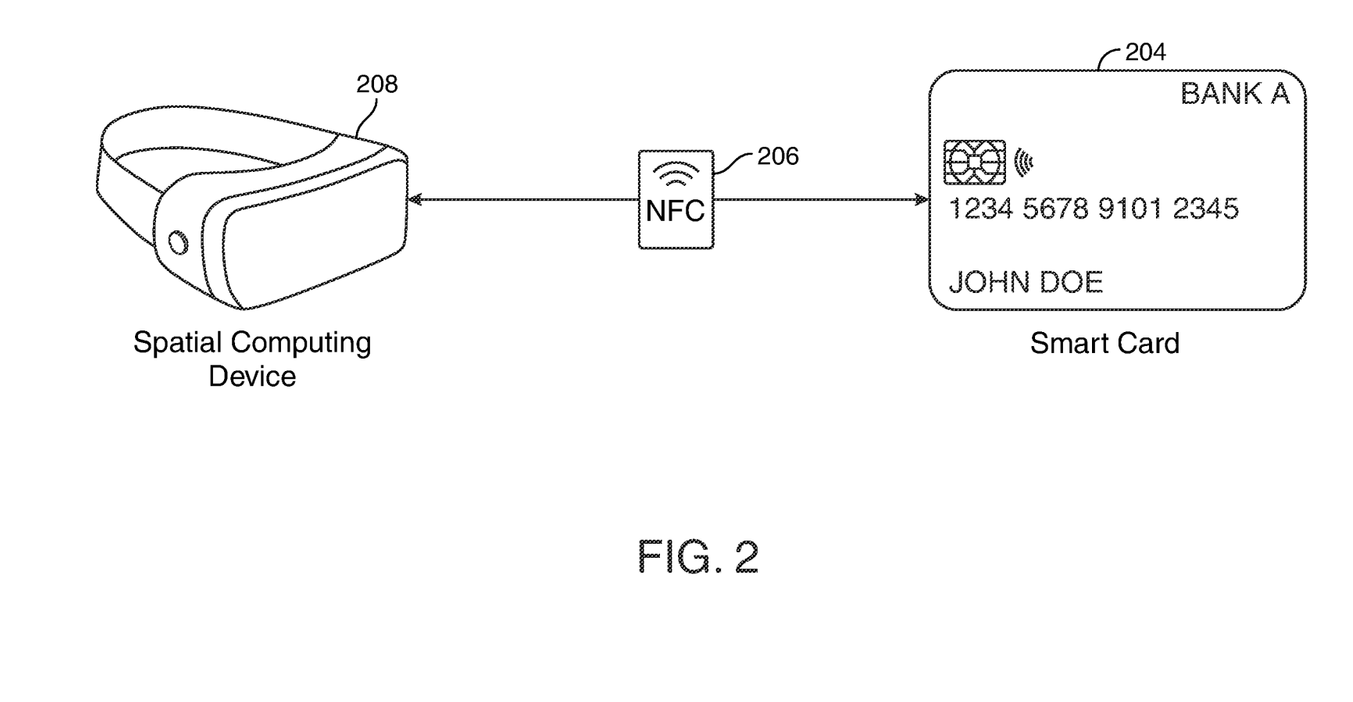
FIG. 2 shows an illustrative diagram in accordance with principles of the disclosure.

FIG. 2 shows an illustrative diagram in accordance with principles of the disclosure.

Spatial computing device 208 may leverage spatial computing technology to enable interacting with digital information in the real world. Spatial computing device 208 may be an augmented reality ("AR") device, a virtual reality ("VR") device or any other suitable device.

Spatial computing device 208 may establish a wireless communication with smart card 204. Smart card 204 may be a credit card. In some embodiments, smart card 204 may be associated with the same financial institution as the spatial computing device 208. In some embodiments, smart card 204 may be associated with a different financial institution.

The wireless communication may be via NFC 206. Wireless communication may be established when spatial computing device and the smart card are within close proximity to each other.

Figure 3:
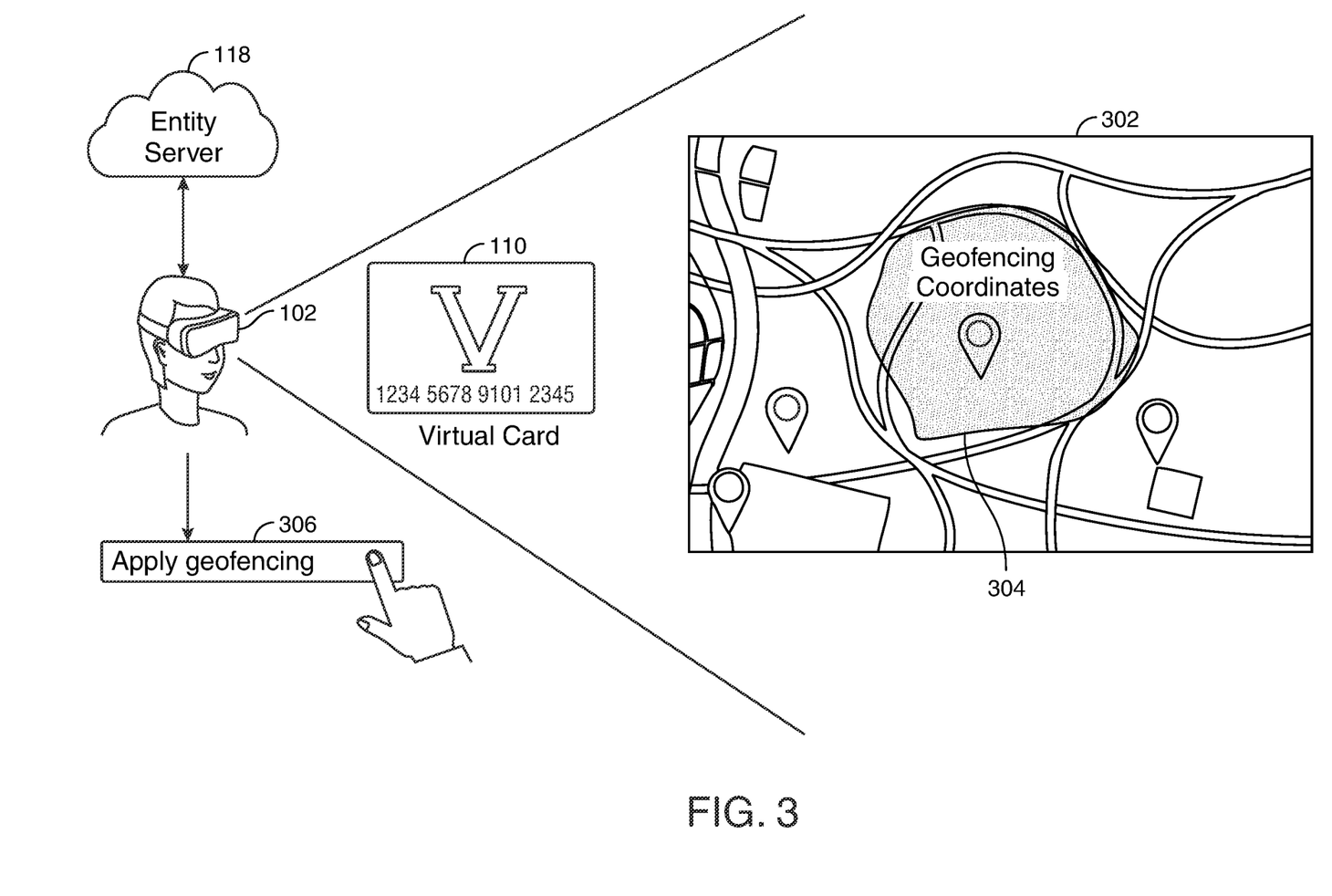
FIG. 3 shows an illustrative exemplary diagram in accordance with principles of the disclosure.

FIG. 3 shows an exemplary diagram of modifying the smart card properties within a spatial computing environment.

The user may be viewing the digital copy of the smart card 110 (virtual card) within spatial computing device 102. Spatial computing device 102 may be in electronic communication with entity server 118. Spatial computing device 102 may execute one or more applications at the spatial computing device for modifying smart card properties. The one or more applications may be retrieved from entity server 118.

In this exemplary diagram, the apply geofencing selectable option 306 may be selected by the user within the spatial computing environment.

Upon selection of selectable option 306, a virtual map 302 may be displayed to the user. Virtual map 302 may be an enlarged image of a geographic location for enabling geofencing. The geographic location may be selected by the user. The geographic location may be selected, via the entity server, based on the location where the user is situated or by some other suitable selection. The geographic location may be selected, via the entity server, based on the location of residency of the user.

The user may select a specific area for geofencing. In this diagram, the user selects location 304. The selection may be performed via touch gestures. The user may circle the area on the virtual map 302 for geofencing. Entity server may extract the coordinates of the location for geofencing for applying the geofencing rules.

Figure 4:
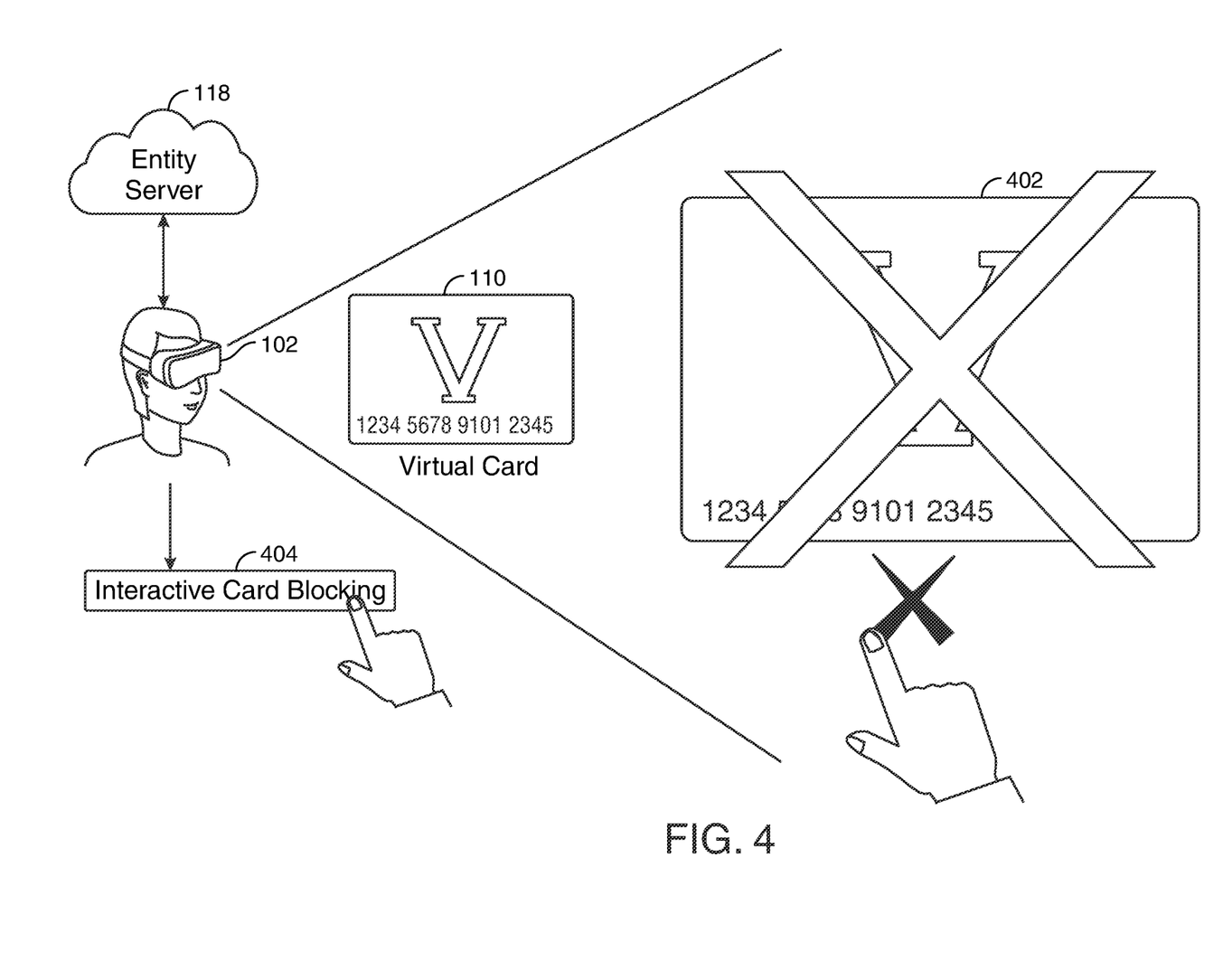
FIG. 4 shows illustrative exemplary diagram in accordance with principles of the disclosure.

FIG. 4 shows another exemplary diagram of modifying the card properties within the spatial computing environment. In this exemplary diagram, the 'interactive card blocking' selectable option 404 may be selected by the user within the spatial computing environment.

In response to a selection of selectable option 404, the user may be enabled to perform one or more gestures for indicating a blocking of the card. The request to block the card may be identified by a cross gesture performed on top of the digital copy of the card via the hand of the user. The cross gesture may trigger a request to be transmitted to entity server 118 for blocking use of the card.

The card may be blocked for a pre-determined duration of time. The pre-determined duration of time may be inputted by the user within the spatial computing environment. The user may put in a time period of a day or two. The user may put in a time period of one week, a month or any other suitable time period.

The request for blocking the card along with the requested time period may be transmitted to the entity server for verification and authentication.

Figure 5:
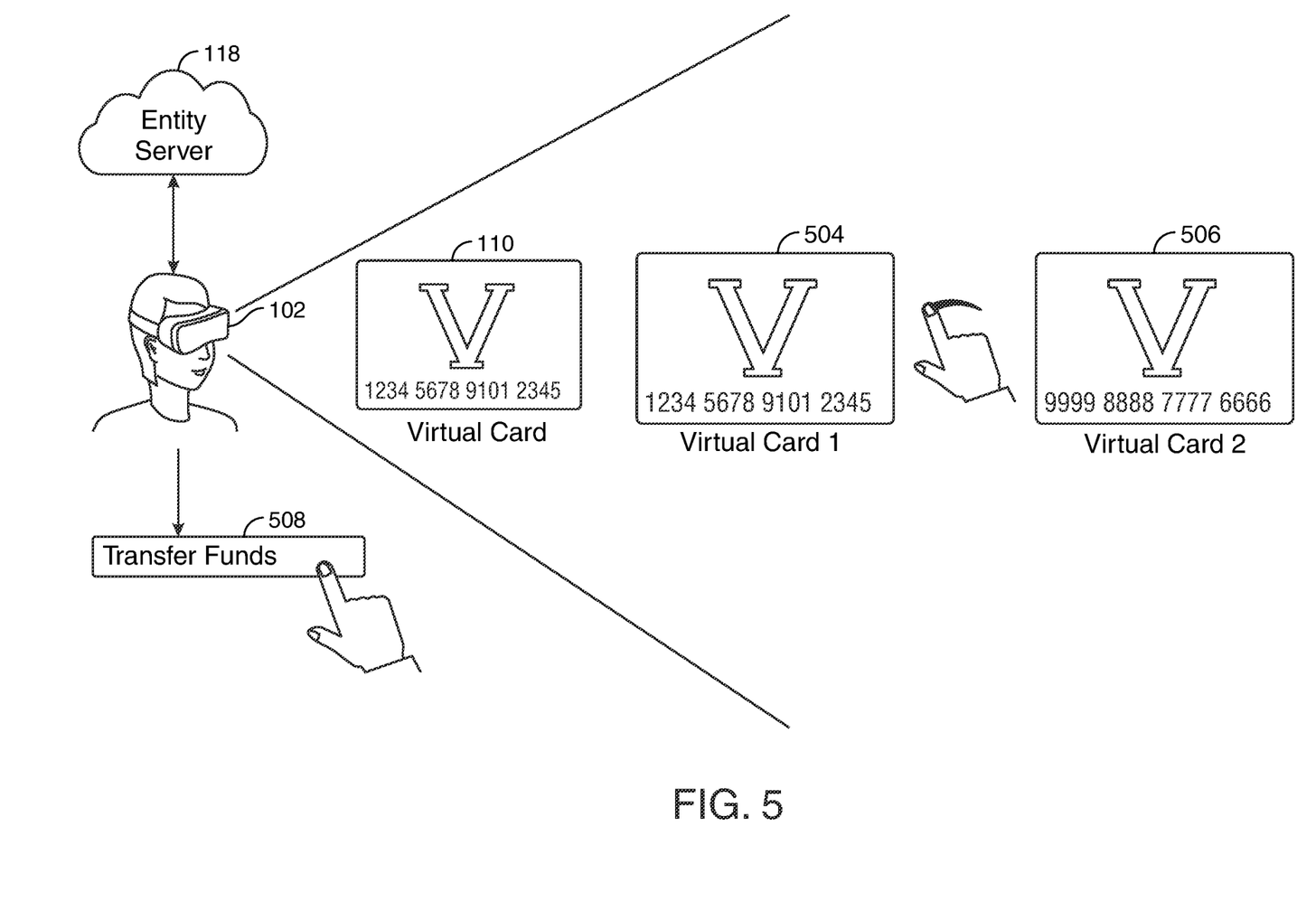
FIG. 5 shows an illustrative exemplary diagram in accordance with principles of the disclosure.

FIG. 5 shows another exemplary diagram of modifying the card properties within the spatial computing environment. In this exemplary diagram, the 'transfer funds' selectable option 508 may be selected by the user within the spatial computing environment.

In response to a selection of the selectable option 508, the user may be enabled to perform one or more gestures for indicating transferring funds from one card to another.

The funds may be transferred from smart card 110. Smart card 504 may be smart card 110 or a different smart card. Smart card 506 may be yet another card. Smart card 506 may be associated with the same financial institution as smart card 110. Smart card 506 may be associated with a different financial institution.

The user may input a value of funds to be transferred. The user may input the amount within the spatial computing environment via finger swipes. Spatial computing device 102 may be enabled to capture the finger swipes, and, using image recognition and ML, identify the value of funds to be transferred.

The request for performing a transfer of funds and/or the value of funds to be transferred may be transmitted to the entity server 118 for authentication.

Figure 6:
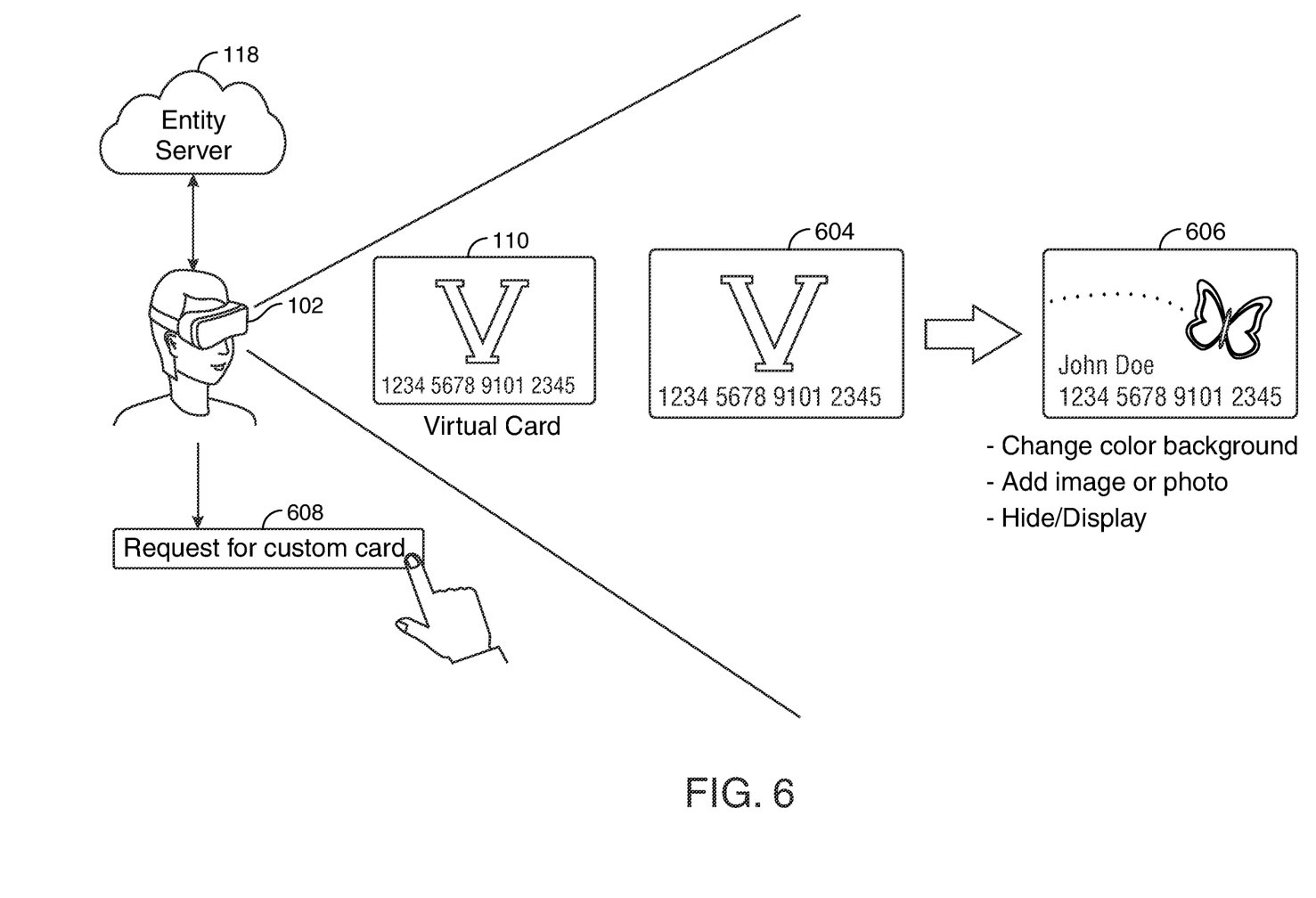
FIG. 6 shows an illustrative exemplary diagram in accordance with principles of the disclosure.

FIG. 6 shows another exemplary diagram of modifying the card properties within the spatial computing environment. In this exemplary diagram, the 'request for custom card' selection option 608 may be selected by the user within the spatial computing environment.

In response to a selection of the selectable option 608, a display of customization card options may be displayed to the user within the spatial computing environment. The selectable options may include a change to the background-color, an option to add an image, an option to display specified data or hide specified data, or any other suitable customization option.

Based on the selection, additional data may be displayed for selection by the user. The additional data may include a choice of colors, images, and/or data for being displayed. As the selections are being selected, smart card 606 may change in real-time based on the selections. This gives a perception of what the changes may look like on the actual smart card.

In some embodiments, when the smart card includes a touch screen, the customization requests, following authentication by the entity server, may be updated in real-time on the smart card.

The request for customizing the smart card may be transmitted to the entity server for authentication. The selected customization options may also be transmitted to the entity server. Upon authentication by the entity server, a new smart card may be issued and mailed to the user.

Figure 7:
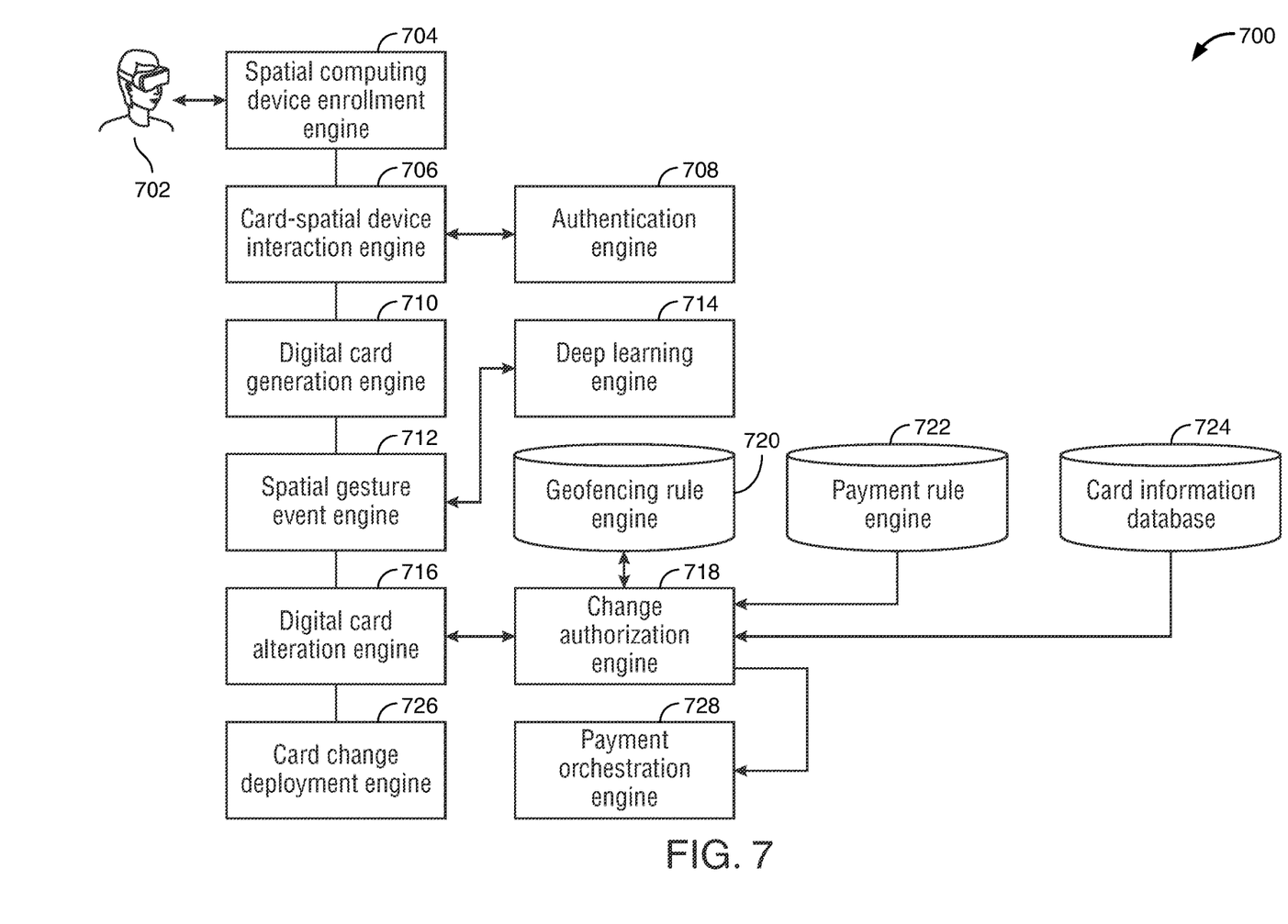
FIG. 7 shows an illustrative flow diagram in accordance with principles of the disclosure.

FIG. 7 shows illustrative apparatus and methods 700 in accordance with principles of the disclosure. It should be appreciated that at least some of the engines illustrated in this diagram may be running on spatial computing device 702. In some embodiments all of the engines and modules may be running on spatial computing device 702. In some embodiments at least some or all the engines and modules may be running at the entity server.

Spatial computing device enrollment engine 704 may be an application for enrolling the device with the entity server, authenticating the device and retrieving updates for the mobile entity applications running at the spatial computing device 702.

Card-spatial device interaction engine 706 may be an application for controlling the interaction between the spatial computing device 702 and the smart card. Spatial computing device enrollment engine 704 may further control the data extracted from the smart card.

Card-spatial device interaction engine 706 may be an application that may run alongside the authentication engine 708. In response to authentication engine 708 authenticating communication between the spatial computing device and the smart card, card-spatial device interaction engine 706 may enable the interacting.

Digital card generation engine 710 may be an application for creating and executing the digital copy of the smart card. Digital card generation engine 710 may monitor and track activity performed at the digital copy. When one or more smart cards are tapped by the user, digital card generation engine 710 may need to capture each tap to enable generating the digital copy for each card.

Spatial gesture event engine 712 may be an application configured to identify the motions and gestures performed with the spatial computing environment. Spatial gesture event engine 712 may leverage deep learning systems 714 including ML and image recognition to identify the gestures and corresponding actions to be executed. Swipe gestures, cross gestures, tapping, geofencing selection on the virtual map and any other suitable gestures may be identified by spatial gesture event engine 712.

Digital card alteration engine 716 may be an application running at the entity server. Digital card alteration engine 716 may apply the modifications to the entity database for future transactions following authorization via the change authorization engine 718.

Geofencing rule engine 720 may be an application for determining the coordinates identified via gestures for geofencing the smart card.

Payment rule engine 722 may be an application for authenticating and executing transactions associated with a selection of a transfer of funds from one smart card to another smart card.

Card information database 724 may be memory at the spatial computing device. Card information database 724 may be a database at the entity server. Card information database 724 may store data associated with the smart card.

Card change deployment engine 726 may be an application that may deploy the changes to the card following authorization.

Payment orchestration engine 728 may be an application that may be executed when the modification to the smart card is associated with a payment, transfer of funds or any other suitable transaction. Payment orchestration engine 728 may execute the transaction.

The spatial computing device, the entity server and the smart card may include one or more computer systems and servers that include one or more of the following hardware components: I/O circuitry, which may include a transmitter device and a receiver device and may interface with fiber optic cable, coaxial cable, telephone lines, wireless devices, physical network layer hardware, a keypad/display control device or any other suitable encoded media or devices; peripheral devices, which may include counter timers, real-time timers, power-on reset generators or any other suitable peripheral devices; a logical processing device, which may compute data structural information, structural parameters of the data, quantify indices; and machine-readable memory.

The source database may be part of a computer system. The target database may be part of a computer system.

The spatial computing device, the entity server and the smart card may include RAM, ROM, an input/output ("I/O") module and a non-transitory or non-volatile memory. Machine-readable memory may store information in machine-readable data structures. The I/O module may include a microphone, button and/or touch screen which may accept user-provided input. The I/O module may include one or more of a speaker for providing audio output and a video display for providing textual, audiovisual and/or graphical output.

Software applications executed by the spatial computing device and the entity server may be stored within the non-transitory memory and/or other storage medium. Software applications may provide instructions to the processor that enable the apparatus to perform various functions. The instructions may include any of the AI methods and processes described herein. For example, the non-transitory memory may store software applications such as object detection algorithms and prediction models. Alternatively, some or all of computer executable instructions of a software application may be embodied in hardware or firmware components of a computer system or server.

Software applications may include computer executable instructions for invoking user functionality related to communication, such as email, short message service ("SMS"), and voice input and speech recognition applications. Software application programs may utilize one or more algorithms that process received executable instructions, perform power management routines or other suitable tasks.

Software applications may utilize computer-executable instructions, such as program modules, executed by a processor. Generally, program modules include routines, programs, objects, components, data structures, etc. that perform particular tasks or implement particular abstract data types. A computing system may be operational with distributed computing environments where tasks are performed by remote processing devices that are linked through a communications network. In a distributed computing environment, program modules may be located in both local and remote computer storage media including memory storage devices. Computing systems may rely on a network of remote servers hosted on the Internet to store, manage, and process data (e.g., "cloud computing" and/or "fog computing").

The spatial computing device and the entity server may be part of two or more networks. The spatial computing device and the entity server may support establishing network connections to one or more remote computing systems. Illustrative network connections may include a local area network ("LAN") and a wide area network ("WAN"). When used in a LAN networking environment, a computing system may be connected to the LAN through a network interface or adapter. A computing system may include a communication circuit. The communication circuit may include a network interface card or adapter.

When used in a WAN networking environment, the spatial computing device, the smart card and the entity server may include a modem, antenna or other circuitry for establishing communications over a WAN, such as the Internet. The communication circuit may include a modem and/or antenna.

The existence of any of various well-known protocols such as TCP/IP, Ethernet, FTP, HTTP and the like is presumed, and a computing system may be operated in a client-server configuration to permit a user to retrieve web pages from a web-based server. Web browsers can be used to display and manipulate data on web pages.

Computer systems and servers may include components, such as a display, battery, speaker, and antennas. Components of a computer system and server may be linked by a system bus, wirelessly or by other suitable interconnections. Components of a computer system and server may be present on one or more circuit boards. In some embodiments, the components may be integrated into a single chip. The chip may be silicon-based.

Thus, systems and methods for modifying smart card properties of a smart card in real-time leveraging a spatial computing device is provided. Persons skilled in the art will appreciate that the present invention can be practiced by other than the described embodiments, which are presented for purposes of illustration rather than of limitation.

What is claimed is:

1. A method for modifying smart card properties of a smart card in real-time, the method leveraging a spatial computing device, the spatial computing device in electronic communication with an entity server, the method comprising:
   authenticating a user of the spatial computing device when the spatial computing device is determined to be positioned on the user;
   identifying, using a camera embedded in the spatial computing device, the smart card within a field of view of the spatial computing device;
   capturing a motion, the motion associated with a first gesture on the smart card;
   in response to the capturing of the motion:
      establishing a wireless communication between the smart card and the spatial computing device;
      generating a digital copy of the smart card; and
      retrieving smart card properties stored at the entity server;
   displaying the digital copy of the smart card on a display of the spatial computing device;
   displaying a plurality of selectable options for modifying smart card properties of the smart card;
   identifying a selection, in response to a detection of a second gesture, of one of the plurality of selectable options;
   transmitting an instruction to the entity server, the instruction comprising a request to modify a property of the smart card based on the selected option; and
   in response to receiving an approval of the request by the entity server, updating a user account associated with the smart card based on the selected option, the user account stored on the entity server.

2. The method of claim 1 wherein the first gesture is a tap gesture on the smart card.

3. The method of claim 1 wherein the authenticating is performed by iris recognition.

4. The method of claim 3 wherein the authenticating comprises automatically scanning a retina of the user and confirming, via the entity server, that the retina matches a stored retina stored in a profile of the user.

5. The method of claim 1 wherein the wireless communication is a near-field communication ("NFC").

6. The method of claim 5, the wireless communication further comprising pairing the spatial computing device to the smart card when the spatial computing device is within a pre-determined proximity of the smart card.

7. The method of claim 1 wherein the plurality of selectable options comprises:
   a geofencing selectable option for geofencing a location for use by the smart card;
   a card lock selectable option;
   a transfer of funds selectable option; and
   a customization selectable option.

8. The method of claim 7 wherein, when the second gesture selects the geofencing selectable option, the method further comprises:
   displaying, in the display, a virtual map of a geographic location;
   capturing a motion of a selection of a geographic boundary from within the display; and
   extracting a plurality of coordinates of the selected geographic boundary;
   wherein, the transmitting of the instruction to the entity server includes a request to modify the geographic boundary of use for the smart card, the geographic boundary of use defined by the plurality of coordinates.

9. The method of claim 7, wherein, when the second gesture selects the card lock selectable option, the method further comprises:
   identifying a request to lock the smart card via capturing a cross gesture motion; and
   receiving input of a time period for a length of time for locking the smart card;
   wherein, the transmitting of the instruction to the entity server includes a request to lock the smart card and the inputted time period.

10. The method of claim 7, wherein, when the second gesture selects the transfer of funds selectable option, the method further comprises:
    identifying an additional smart card within the field of view of the spatial computing device;
    capturing a motion associated with the first gesture on the additional smart card;
    in response to the capturing of the motion:
       establishing the electronic communication with the additional smart card;
       generating a digital copy of the additional smart card; and
       authenticating the additional smart card via the entity server; and
    when the motion is identified comprising a swipe gesture, identifying a request to execute the transfer of funds from the smart card to the additional smart card;
    wherein, the transmitting the instruction to the entity server includes a request to execute the transfer of funds to the additional smart card.

11. The method of claim 7 wherein, when the second gesture selects the customization selectable option, the method further comprises:
    displaying a plurality of customization options in the display; and
    receiving a selection of one or more selections from the plurality of customization options via a third gesture;
    wherein, the transmitting the instruction to the entity server includes a request to customize the smart card and the selected one or more selections from the plurality of customization options.

12. A spatial computing device for modifying smart card properties of a smart card in real-time, the spatial computing device in electronic communication with an entity server, the spatial computing device comprising:
    a microprocessor operable to authenticate a user of the spatial computing device when the spatial computing device is positioned on the user;
    a camera operable to:

identify the smart card when the smart card is within a predetermined proximity to the spatial computing device;

capture a motion, the motion associated with a first gesture on the smart card; and generate a digital copy of the smart card;

a wireless communication module operable to, in response to the motion identified:

pair the spatial computing device to the smart card; and retrieve smart card properties stored at the smart card;

a display operable to display an augmented reality display of:

the digital copy of the smart card; and a plurality of selectable options for modifying the smart card properties;

the camera further operable to identify a selection, in response to a detection of a second gesture, of one of the plurality of selectable options;

the microprocessor further operable to:

based on the selection of one of the plurality of selectable options, transmit an instruction to the entity server, the instruction comprising a request to modify a property of the smart card based on the selected option; and a battery operable to power the camera, the microprocessor and the display.

13. The spatial computing device of claim 12 wherein the wireless communication is a near-field communication ("NFC").

14. The spatial computing device of claim 13 further comprising an NFC tag, an NFC reader and an antennae for communicating with the smart card.

15. The spatial computing device of claim 12 wherein the smart card comprises NFC capabilities.

16. The spatial computing device of claim 12 wherein the microprocessor authenticates the user via authentication of a biometric of the user.

17. The spatial computing device of claim 16 wherein when the biometric of the user is not authenticated, the spatial computing device is automatically deactivated.

18. A method for modifying smart card properties of a smart card in real-time, the method leveraging a spatial computing device, the spatial computing device in electronic communication with an entity server, the method comprising:

authenticating a user of the spatial computing device when the spatial computing device is determined to be positioned on the user;

identifying, using a camera embedded in the spatial computing device, the smart card within a field of view of the spatial computing device;

capturing a motion, the motion associated with a first gesture on the smart card;

in response to the capturing of the motion:

establishing a wireless communication between the smart card and the spatial computing device;

generating a digital copy of the smart card;

retrieving the smart card properties stored at the smart card; and retrieving the smart card properties stored at the entity server;

displaying the digital copy of the smart card on a display of the spatial computing device;

displaying a plurality of selectable options for modifying the smart card properties;

identifying a selection, in response to a detection of a second gesture, of one of the plurality of selectable options;

transmitting a first instruction to the entity server, the first instruction comprising a request to modify a property of the smart card based on the selected option;

in response to receiving an approval of the request by the entity server, updating a user account associated with the smart card based on the selected option, the user account stored on the entity server; and transmitting a second instruction to the smart card, the second instruction comprising automatically synchronizing the selected modifications to the smart card properties stored on the smart card, the modifications to the smart card properties based, at least in part, on the selected option.

19. The method of claim 18 wherein the smart card comprises an embedded subscriber identification module ("E-SIM") embedded in the smart card and the smart card properties are stored on the E-SIM.

20. The method of claim 18 further comprising, prior to updating the user account based on the selected option:

displaying, on the display, a request to confirm the updating;

in response to detecting a motion confirming the updating, transmitting a communication to the entity server to update the user account; and disabling the wireless communication between the spatial computing device and the smart card.

* * * * *